(12) United States Patent
Wang (10) Patent No.: US 6,985,314 B1
(45) Date of Patent: Jan. 10, 2006

(54) METHOD AND APPARATUS FOR FIXED-GAP, CONSTANT-FIELD PATTERNING OF MAGNETIC MEDIA BY CONTACT PRINTING

(75) Inventor: Li-Ping Wang, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 243 days.

(21) Appl. No.: 10/434,061

(22) Filed: May 9, 2003

Related U.S. Application Data (60) Provisional application No. 60/392,831, filed on Jun. 28, 2002.

(51) Int. Cl.
*G11B 5/86* (2006.01)

(52) U.S. Cl. .......................... 360/17; 360/16
(58) Field of Classification Search ............ 360/15–17; 428/692, 694 R
See application file for complete search history.

(56) References Cited

U.S. PATENT DOCUMENTS

| | | | |
|---|---|---|---|
| 6,594,099 B2 * | 7/2003 | Serizawa | 360/66 |
| 6,747,822 B2 * | 6/2004 | Saito | 360/17 |
| 6,906,876 B2 * | 6/2005 | Komatsu et al. | 360/17 |

* cited by examiner

*Primary Examiner*—David Hudspeth
*Assistant Examiner*—Dan I Davidson
(74) *Attorney, Agent, or Firm*—McDermott Will & Emery LLP (57) ABSTRACT

A method of forming a magnetic transition pattern in a magnetic material by contact printing comprises steps of providing a stacked assembly including a workpiece including a surface comprised of the magnetic material including a plurality of initialized, unidirectionally aligned magnetic domains, and a high saturation magnetization stamper having an imprinting surface in intimate contact with the workpiece surface, the imprinting surface comprising a plurality of projections and depressions arranged in a pattern corresponding to the magnetic transition pattern to be formed in the magnetic material, and selectively magnetically re-aligning the initialized, unidirectionally aligned magnetic domains by placing the assembly in a fixed gap contact printing apparatus including a magnet means having a pair of spaced-apart, stationary magnetic poles providing an oppositely directed, uniform intensity, unidirectional re-alignment magnetic field.

20 Claims, 5 Drawing Sheets

METHOD AND APPARATUS FOR FIXED-GAP, CONSTANT-FIELD PATTERNING OF MAGNETIC MEDIA BY CONTACT PRINTING

CROSS-REFERENCE TO PROVISIONAL APPLICATION

This application claims priority from U.S. provisional patent application Ser. No. 60/392,831 filed Jun. 28, 2002, the entire disclosure of which is incorporated herein by reference.

FIELD OF THE INVENTION

The present invention relates to methods and devices for forming magnetic transition patterns in a layer or body of magnetic material. The invention has particular utility in the formation of servo patterns in the surfaces of magnetic recording layers of magnetic data/information storage and retrieval media, e.g., hard disks.

BACKGROUND OF THE INVENTION

Magnetic recording media are widely used in various applications, e.g., in hard disk form, particularly in the computer industry for storage and retrieval of large amounts of data/information in magnetizable form. Such media are conventionally fabricated in thin film form and are generally classified as "longitudinal" or "perpendicular", depending upon the orientation (i.e., parallel or perpendicular) of the magnetic domains of the grains of the magnetic material constituting the active magnetic recording layer, relative to the surface of the layer.

Figure 1:
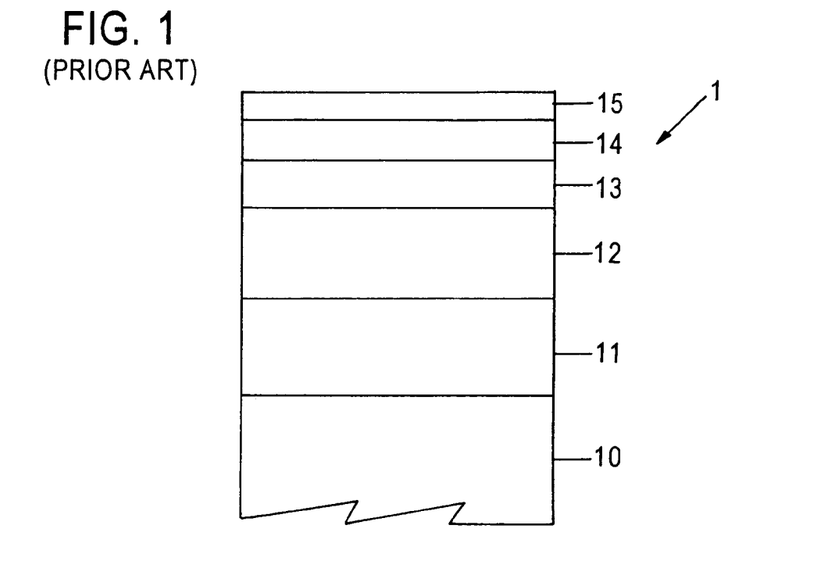
FIG. 1 illustrates, in schematic, simplified cross-sectional view, a portion of a longitudinal-type thin film magnetic recording medium.

A portion of a conventional thin-film, longitudinal-type recording medium 1 utilized in disk form in computer-related applications is schematically depicted in FIG. 1 and comprises a non-magnetic substrate 10, typically of glass or a metal, e.g., an aluminum-magnesium (Al—Mg) alloy, having sequentially deposited thereon a plating layer 11, such as of amorphous nickel-phosphorus (NiP), a polycrystalline underlayer 12, typically of chromium (Cr) or a Cr-based alloy, a magnetic layer 13, e.g., of a cobalt (Co)-based alloy, a protective overcoat layer 14, typically containing carbon (C), e.g., diamond-like carbon ("DLC"), and a lubricant topcoat layer 15, typically of a perfluoropolyether compound applied by dipping, spraying, etc.

In operation of medium 1, the magnetic layer 13 is locally magnetized by a write transducer or write head (not shown in FIG. 1 for simplicity) to record and store data/information. The write transducer creates a highly concentrated magnetic field which alternates direction based on the bits of information being stored. When the local magnetic field applied by the write transducer is greater than the coercivity of the recording medium layer 13, then the grains of the polycrystalline medium at that location are magnetized. The grains retain their magnetization after the magnetic field applied by the write transducer is removed. The direction of the magnetization matches the direction of the applied magnetic field. The pattern of magnetization of the recording medium can subsequently produce an electrical response in a read transducer, allowing the stored medium to be read.

Figure 2:
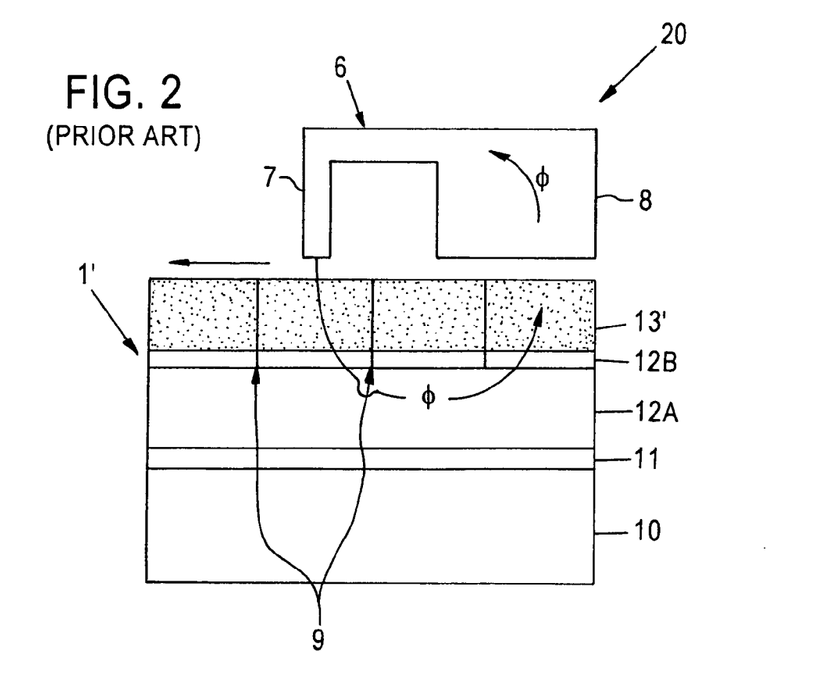
FIG. 2 illustrates, in schematic, simplified cross-sectional view, a portion of a magnetic recording, storage, and retrieval system comprised of a perpendicular-type magnetic recording medium and a single-pole transducer head.

A typical recording system 20 utilizing a thin-film, vertically oriented, perpendicular-type magnetic medium 1' is illustrated in FIG. 2, wherein reference numerals 10, 11, 12A, 12B and 13', respectively, indicate the substrate, plating layer, soft magnetic underlayer, at least one non-magnetic interlayer, and vertically oriented, hard magnetic recording layer of perpendicular-type magnetic medium 1, and reference numerals 7 and 8, respectively, indicate the single and auxiliary poles of single-pole magnetic transducer head 6. Relatively thin interlayer 12B (also referred to as an "intermediate" layer), comprised of one or more layers of non-magnetic materials, serves to (1) prevent magnetic interaction between the soft underlayer 12A and the hard recording layer 13' and (2) promote desired microstructural and magnetic properties of the hard recording layer. As shown by the arrows in the figure indicating the path of the magnetic flux $\phi$, flux $\phi$ is seen as emanating from single pole 7 of single-pole magnetic transducer head 6, entering and passing through vertically oriented, hard magnetic recording layer 13' (which, as is known, may comprise a Co-based alloy, an iron oxide, or a multilayer magnetic superlattice structure) in the region above single pole 7, entering and travelling along soft magnetic underlayer 12A for a distance, and then exiting therefrom and passing through vertically oriented, hard magnetic recording layer 13' in the region above auxiliary pole 8 of single-pole magnetic transducer head 6. The direction of movement of perpendicular magnetic medium 1 past transducer head 6 is indicated in the figure by the arrow above medium 1.

With continued reference to FIG. 2, vertical lines 9 indicate grain boundaries of each polycrystalline (i.e., granular) layer of the layer stack constituting medium 1. As apparent from the figure, the width of the grains (as measured in a horizontal direction) of each of the polycrystalline layers constituting the layer stack of the medium is substantially the same, i.e., each overlying layer replicates the grain width of the underlying layer. Not shown in the figure, for illustrative simplicity, are a protective overcoat layer 14, such as of a diamond-like carbon (DLC) formed over hard magnetic layer 13', and a lubricant topcoat layer 15, such as of a perfluoropolyethylene material, formed over the protective overcoat layer. As with the longitudinal-type recording medium 1 shown in FIG. 1, substrate 10 is typically disk-shaped and comprised of a non-magnetic metal or alloy, e.g., Al or an Al-based alloy, such as Al—Mg having an Ni—P plating layer 11 on the deposition surface thereof, or substrate 10 is comprised of a suitable glass, ceramic, glass-ceramic, polymeric material, or a composite or laminate of these materials; soft underlayer 12A is typically comprised of an about 500 to about 4,000 Å thick layer of a soft magnetic material selected from the group consisting of Ni, NiFe (Permalloy), Co, CoZr, CoZrCr, CoZrNb, CoFe, Fe, FeN, FeSiAl, FeSiAlN, etc.; thin interlayer 12B typically comprises an up to about 100 Å thick layer of a non-magnetic material, such as TiCr; and hard magnetic layer 13' is typically comprised of an about 100 to about 250 Å thick layer of a Co-based alloy including one or more elements selected from the group consisting of Cr, Fe, Ta, Ni, Mo, Pt, V, Nb, Ge, and B, iron oxides, such as $Fe_3O_4$ and $\delta$—$Fe_2O_3$, or a $(CoX/Pd \text{ or } Pt)_n$ multilayer magnetic superlattice structure, where n is an integer from about 10 to about 25, each of the alternating, thin layers of Co-based magnetic alloy is from about 2 to about 3.5 Å thick, X is an element selected from the group consisting of Cr, Ta, B, Mo, and Pt, and each of the alternating thin, non-magnetic layers of Pd or Pt is about 1 Å thick. Each type of hard magnetic recording layer material has perpendicular anisotropy arising from magneto-crystalline anisotropy ($1^{st}$ type) and/or interfacial anisotropy ($2^{nd}$ type).

A typical contact start/stop (CSS) method employed during use of disk-shaped media involves a floating transducer head gliding at a predetermined distance from the surface of the disk due to dynamic pressure effects caused by air flow generated between mutually sliding surfaces of the transducer head and the disk. During reading and recording (writing) operations, the transducer head is maintained at a controlled distance from the recording surface, supported on a bearing of air as the disk rotates, such that the transducer head is freely movable in both the circumferential and radial directions, thereby allowing data to be recorded and retrieved from the disk at a desired position in a data zone.

Figure 3:
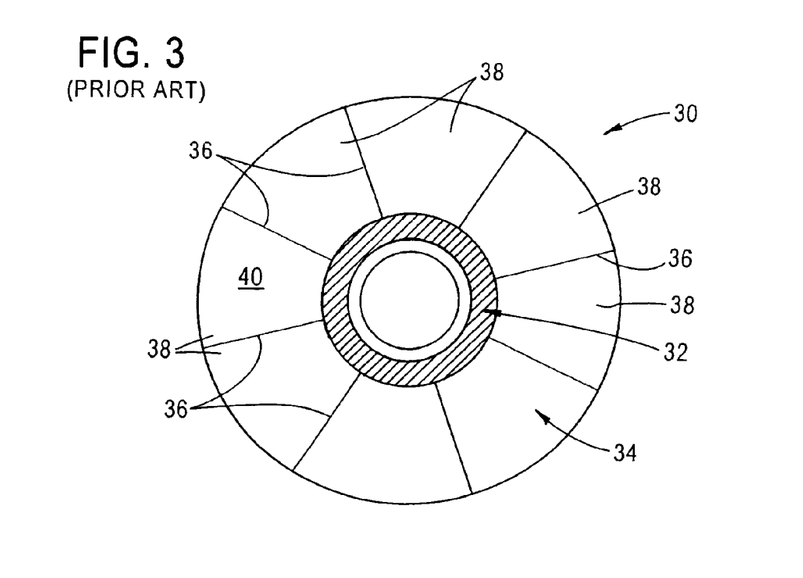
FIG. 3 is a simplified, schematic plan view, of a magnetic recording disk for illustrating the data, servo pattern, and CSS zones thereof.

Adverting to FIG. 3, shown therein, in simplified, schematic plan view, is a magnetic recording disk 30 (of either longitudinal or perpendicular type) having a data zone 34 including a plurality of servo tracks, and a contact start/stop (CSS) zone 32. A servo pattern 40 is formed within the data zone 34, and includes a number of data track zones 38 separated by servo tracking zones 36. The data storage function of disk 30 is confined to the data track zones 38, while servo tracking zones 36 provide information to the disk drive which allows a read/write head to maintain alignment on the individual, tightly-spaced data tracks.

Although only a relatively few of the servo tracking zones are shown in FIG. 3 for illustrative simplicity, it should be recognized that the track patterns of the media contemplated herein may include several hundreds of servo zones to improve head tracking during each rotation of the disk. In addition, the servo tracking zones need not be straight radial zones as shown in the figure, but may instead comprise arcs, intermittent zones, or irregularly-shaped zones separating individual data tracks.

In conventional hard disk drives, data is stored in terms of bits along the data tracks. In operation, the disk is rotated at a relatively high speed, and the magnetic head assembly is mounted on the end of a support or actuator arm, which radially positions the head on the disk surface. If the actuator arm is held stationary, the magnetic head assembly will pass over a circular path on the disk, i.e., over a data track, and information can be read from or written to that track. Each concentric track has a unique radius, and reading and writing information from or to a specific track requires the magnetic head to be located above that track. By moving the actuator arm, the magnetic head assembly is moved radially on the disk surface between tracks. Many actuator arms are rotatable, wherein the magnetic head assembly is moved between tracks by activating a servomotor which pivots the actuator arm about an axis of rotation. Alternatively, a linear actuator may be used to move a magnetic head assembly radially inwardly or outwardly along a straight line.

As has been stated above, to record information on the disk, the transducer creates and applies a highly concentrated magnetic field in close proximity to the magnetic recording medium. During writing, the strength of the concentrated magnetic field directly under the write transducer is greater than the coercivity of the recording medium, and grains of the recording medium at that location are magnetized in a direction which matches the direction of the applied magnetic field. The grains of the recording medium retain their magnetization after the magnetic field is removed. As the disk rotates, the direction of the writing magnetic field is alternated, based on bits of the information being stored, thereby recording a magnetic pattern on the track directly under the write transducer.

On each track, eight "bits" typically form one "byte" and bytes of data are grouped as sectors. Reading or writing a sector requires knowledge of the physical location of the data in the data zone so that the servo-controller of the disk drive can accurately position the read/write head in the correct location at the correct time. Most disk drives use disks with embedded "servo patterns" of magnetically readable information. The servo patterns are read by the magnetic head assembly to inform the disk drive of track location. In conventional disk drives, tracks typically include both data sectors and servo patterns and each servo pattern typically includes radial indexing information, as well as a "servo burst". A servo burst is a centering pattern to precisely position the head over the center of the track. Because of the locational precision needed, writing of servo patterns requires expensive servo-pattern writing equipment and is a time consuming process.

Commonly assigned U.S. Pat. No. 5,991,104 to Bonyhard, the entire disclosure of which is incorporated herein by reference, discloses a method for forming a servo pattern in a magnetic disk, comprising the steps of:

1) aligning a magnetic disk immediately adjacent a master servo-writer medium, the latter having a greater magnetic coercivity than the former, wherein the servo-writer medium has a master servo pattern magnetically stored thereon which defines a plurality of concentric tracks;

2) applying a magnetic assist field to the aligned master servo-writer medium and magnetic disk, the magnetic assist field having a substantially equal magnitude at all tracks on the aligned master servo-writer medium and magnetic disk; and 3) rotating the aligned master servo-writer medium and magnetic disk relative to the magnetic assist field.

However, the above-described method incurs several drawbacks associated with its implementation in an industrially viable manner. Specifically, a "one-of-a-kind" master writer with a very high write field gradient is necessary for writing the requisite high intensity, master magnetic servo pattern onto the master disk, and a complicated means for rotating the aligned master servo-writer disk and "slave" workpiece magnetic disk is required, as is a complex system for controlling/regulating/rotating the intensity (i.e., magnitude) and directions of the magnetic assist field.

Commonly assigned, co-pending U.S. patent application Ser. No. 10/082,178, filed Feb. 26, 2002, the entire disclosure of which is incorporated herein by reference, discloses an improvement over the invention disclosed in the aforementioned commonly assigned U.S. Pat. No. 5,991,104, and is based upon the discovery that very sharply defined magnetic transition patterns can be reliably, rapidly, and cost-effectively formed in a magnetic medium containing a longitudinal or perpendicular type magnetic recording layer: (1) without requiring expensive, complicated fabrication of a master disk (alternatively referred to as a "stamper/imprinter") having a contacting (i.e., imprinting) surface comprised of a plurality of magnets or magnetized areas corresponding to the desired magnetic transition pattern to be formed in the magnetic disk (i.e., "slave"), and (2) without requiring rotation of the master/slave pair in a magnetic assist field of variable strength and polarity.

Specifically, the invention disclosed in co-pending, commonly assigned U.S. patent application Ser. No. 10/082,178 is based upon recognition that a stamper/imprinter ("master") comprised of a magnetic material having a high saturation magnetization, $B_{sat}$, i.e., $B_{sat} \geq$ about 0.5 Tesla, and a high permeability, $\mu$, i.e., $\mu \geq$ about 5, e.g., selected from Ni, NiFe, CoNiFe, CoSiFe, CoFe, and CoFeV, can be effectively utilized as a "master" contact mask (or "stamper/imprinter") for "imprinting" of a magnetic transition pattern, e.g., a servo pattern, in the surface of a magnetic recording layer of a magnetic medium ("slave"), whether of longitudinal or perpendicular type. A key feature of the invention is the use of a stamper/imprinter having an imprinting surface including a topographical pattern, i.e., comprised of projections and depressions, corresponding to a desired magnetic transition pattern, e.g., a servo pattern, to be formed in the magnetic recording layer. An advantage afforded by the invention is the ability to fabricate the topographically patterned imprinting surface of the stamper/imprinter, as well as the substrate or body therefor, of a single material, as by use of well-known and economical electro-forming techniques.

According to the disclosed invention, the magnetic domains of the magnetic recording layer of the slave medium are first unidirectionally aligned (i.e., "erased" or "initialized"), as by application of a first external, unidirectional magnetic field $H_{initial}$ of first direction and high strength greater than the saturation field of the magnetic recording layer, typically $\geq$ 2,000 and up to about 20,000 Oe. The imprinting surface of the stamper/imprinter (master) is then brought into intimate (i.e., touching) contact with the surface of the magnetic recording layer (slave). With the assistance of a second externally applied magnetic field of second, opposite direction and lower but appropriate strength $H_{re-align}$, determined by $B_{sat}/\mu$ of the stamper material (typically $\geq$ 100 Oe, e.g., from about 2,000 to about 4,500 Oe), the alignment of the magnetic domains at the areas of contact between the projections of the imprinting surface of the stamper/imprinter or at the areas facing the depressions of the imprinting surface of the stamper/imprinter and the magnetic recording layer of the medium to be patterned (slave) is selectively reversed, while the alignment of the magnetic domains at the non-contacting areas (defined by the depressions in the imprinting surface of the stamper/imprinter) or at the contacting areas, respectively, is unaffected, whereby a sharply defined magnetic transition pattern is created within the magnetic recording layer of the medium to be patterned (slave) which essentially mimics the topographical pattern of projections and depressions of the imprinting surface (master). According to the invention, high $B_{sat}$ and high $\mu$ materials are preferred for use as the stamper/imprinter in order to: (1) avoid early magnetic saturation of the stamper/imprinter at the contact points between the projections of the imprinting surface and the magnetic recording layer, and (2) provide an easy path for the magnetic flux lines which enter and/or exit at the side edges of the projections.

A stamper/imprinter for use in a typical application according to the disclosed invention, e.g., servo pattern formation in a disk-shaped, thin film, longitudinal or perpendicular magnetic recording medium, is formed according to conventional techniques, and comprises an imprinting surface having topographical features consisting of a pattern of well-defined projections and depressions corresponding to conventional servo patterns, as for example, disclosed in the aforementioned commonly assigned U.S. Pat. No. 5,991,104 the entire disclosure of which is incorporated herein by reference. For example, a suitable topography may comprise a plurality of projections having a height in the range from about 20 to about 500 nm, a width in the range from about 0.01 to about 1 $\mu$m, and a spacing of at least about 0.01 $\mu$m. Stampers/imprinters comprising imprinting surfaces with suitable surface topographies may be readily formed by a variety of techniques, such as electroforming onto a planar-surfaced substrate through an apertured, non-conductive mask, or by pattern formation in a planar-surfaced substrate by means photolithographic wet (i.e., chemical) or dry (e.g., plasma, sputter, or ion beam) etching techniques.

Figure 4:
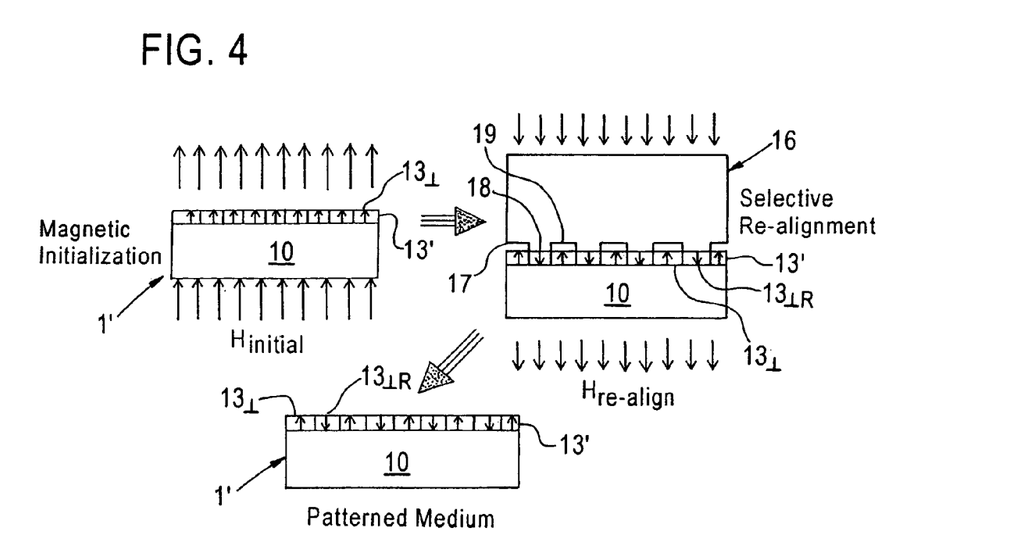
FIG. 4 illustrates, in schematic, simplified cross-sectional view, a sequence of process steps for contact printing a magnetic transition pattern in the surface of a perpendicular magnetic recording layer, utilizing a stamper having an imprinting surface corresponding to the desired magnetic transition pattern and formed of a high saturation magnetization, high permeability magnetic material.

FIG. 4 illustrates a sequence of steps for performing magnetic transition patterning by contact printing of a perpendicular recording medium, e.g., medium 1' depicted in FIG. 2 and comprised of a non-magnetic substrate 10 and an overlying thin layer 13' of a perpendicular-type magnetic recording material (where plating layer 11, soft magnetic underlayer 12A, and non-magnetic interlayer 12B are omitted from FIG. 4 in order to not unnecessarily obscure the essential features/aspects of the present invention) is subjected to a DC erase or magnetic initialization process for unidirectionally aligning the perpendicularly oriented magnetic domains 13⊥ of magnetic recording layer 13'. Magnetic initialization of perpendicular medium 1' is accomplished by applying a first, high strength, unidirectional DC magnetic initialization field $H_{initial}$ normal to the opposed major surfaces thereof, i.e., normal to the lower surface of substrate 10 and upper surface of magnetic recording layer 13', wherein $H_{initial} \geq$ coercivity of layer 13' and is typically in the range from above about 2,000 to about 20,000 Oe.

According to the next step of the process sequence, a stamper/imprinter 16 composed of composed of a body of magnetic material having a high saturation magnetization, $B_{sat}$, i.e., $B_{sat} \geq$ about 0.5 Tesla, and a high permeability, $\mu$, i.e., $\mu \geq$ about 5, e.g., selected from Ni, NiFe, CoNiFe, CoSiFe, CoFe, and CoFeV, and having an imprinting surface 17 having a topography comprised of a plurality of projections 18 and depressions 19 arranged in a pattern corresponding to a magnetic transition pattern to be formed in the surface of magnetic recording layer 13', e.g., a servo pattern, is placed in intimate (i.e., touching) contact with the surface of layer 13'. By way of illustration only, a suitable topography for the imprinting surface 17 of a contact mask-type stamper/imprinter 16 for use in forming a servo pattern according to the invention may comprise a plurality of projections 18 having a height in the range from about 20 to about 500 nm, a width in the range from about 0.01 to about 1 $\mu$m, and a spacing (defining the depressions 19) of at least about 0.01 $\mu$m). A second, unidirectional DC magnetic re-alignment field $H_{re-align}$ of direction reverse that of the DC magnetic initialization field $H_{initial}$ is then applied normal to the upper surface of stamper/imprinter 16 and the lower surface of substrate 10 of medium 1', the strength of $H_{re-align}$ being lower than that of $H_{initial}$ and optimized at a value determined by $B_{sat}/\mu$ of the stamper material (typically $\geq$ 100 Oe, e.g., from about 2,000 to about 4,500 Oe for the above-listed high $B_{sat}$, high $\mu$ materials). According to the invention, due to the high permeability $\mu$ of the stamper material, the magnetic flux $\phi$ provided by the re-alignment field $H_{re-align}$ tends to concentrate at the projections 18 of the stamper/imprinter 16, which projections are in touching contact with the surface of magnetic recording layer 13'. As a consequence, the surface areas of magnetic recording layer 13' immediately beneath the projections 18 experience a significantly higher magnetic field than the surface areas at the non-contacting areas facing the depressions 19. If the re-alignment field strength $H_{re-align}$ is optimized (e.g., as described supra), the direction of magnetization (i.e., alignment) of the perpendicularly oriented magnetic domains 13⊥ will be selectively reversed (as indicated by the arrows in the figure) at the areas of the magnetic recording layer 13' where the projections 18 of the imprinting surface 17 of the stamper/imprinter 16 contact the surface of the magnetic recording layer 13', and the magnetic alignment of the perpendicularly oriented magnetic domains 13⊥ facing the depressions 19 in the imprinting surface 17 will be retained. Consequently, upon removal of the stamper/imprinter 16 and the re-alignment field $H_{re-align}$ in the next (i.e., final) step according to the inventive methodology, a perpendicular recording medium 1' is formed with a magnetic transition pattern comprising a plurality of reversely oriented perpendicular magnetic domains $13_{\perp R}$ corresponding to a desired servo pattern.

Figure 5:
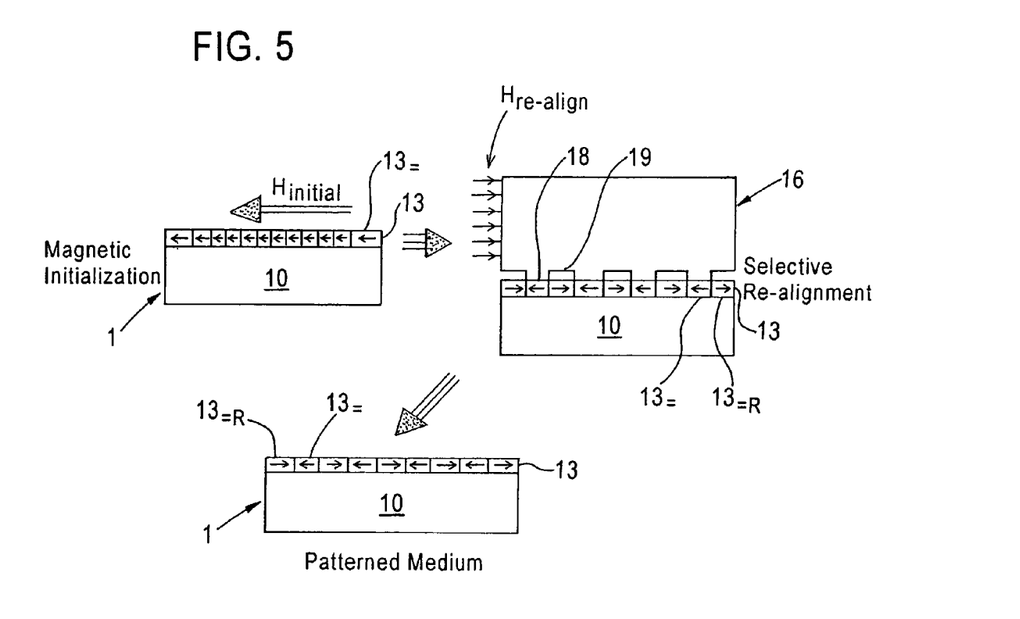
FIG. 5 illustrates, in schematic, simplified cross-sectional view, a similar sequence of process steps for contact printing a magnetic transition pattern in the surface of a longitudinal magnetic recording layer.

FIG. 5 illustrates a similar sequence of steps for performing magnetic transition patterning by contact printing of a longitudinal recording medium, e.g., medium 1 depicted in FIG. 1 and comprised of a non-magnetic substrate 10 and an overlying thin layer 13 of a longitudinal-type magnetic layer (where plating layer 11, polycrystalline underlayer 12, protective overcoat layer 14, and lubricant topcoat layer 15 are omitted from FIG. 5 in order not to unnecessarily obscure the essential features/aspects of the present invention) is initially subjected to a magnetic erase (or "initialization") process for unidirectionally aligning the longitudinally oriented magnetic domains $13_=$ of magnetic recording layer 13. Magnetic initialization of longitudinal medium 1 is accomplished by applying a first, high strength, unidirectional magnetic field $H_{initial}$ parallel to the surface of the magnetic recording layer, such that $H_{initial} \geqq$ coercivity of layer 13' and is typically in the range from about 2,000 to about 20,000 Oe. In this instance, $H_{initial}$ is applied perpendicularly (i.e., normal) to the side edges of medium 1, whereas, by contrast, $H_{initial}$ for a perpendicular medium would be applied normal to the upper and lower major surfaces of the medium.

According to the next step of the process sequence, a stamper/imprinter 16 comprised of a body of magnetic material having a high saturation magnetization, $B_{sat}$, i.e., $B_{sat} \geqq$ about 0.5 Tesla, and a high permeability, $\mu$, i.e., $\mu \geqq$ about 5, e.g., selected from Ni, NiFe, CoNiFe, CoSiFe, CoFe, and CoFeV, and having an imprinting surface 17 having a topography comprised of a plurality of projections 18 and depressions 19 arranged in a pattern corresponding to a magnetic transition pattern to be formed in the surface of magnetic recording layer 13, e.g., a servo pattern, is placed in intimate (i.e., touching) contact with the surface of layer 13. A suitable topography for the imprinting surface 17 of a contact mask-type stamper/imprinter 16 for use in forming a servo pattern in longitudinal recording layer 13 according to the invention may comprise a plurality of projections 18 having a height in the range from about 20 to about 500 nm, a width of at least about 0.01 $\mu$m, and a spacing (defining the depressions 19) in the range from about 0.01 to about 1 $\mu$m. A second, unidirectional magnetic re-alignment field $H_{re-align}$ parallel to the major surface of magnetic recording layer 13 but of lower strength and direction reverse that of the magnetic initialization field $H_{initial}$ is then applied normal to the side edge surfaces of stamper/imprinter 16, the strength of $H_{re-align}$ being optimized at a value determined by $B_{sat}/\mu$ of the stamper material (typically $\geqq$ 100 Oe, e.g., from about 2,000 to about 4,500 Oe for the above-listed high $B_{sat}$, high $\mu$ materials). According to the invention, due to the high permeability $\mu$ of the stamper material, the magnetic flux $\phi$ provided by the re-alignment field $H_{re-align}$ enters and exits the side edges of the projections and tends to concentrate at the depressions 19 of the stamper/imprinter 16 (rather than at the projections 18). As a consequence, the non-contacted surface areas of magnetic recording layer 13 immediately beneath the depressions 19 experience a significantly higher magnetic field than the surface areas of the magnetic recording layer 13 in contact with the projections 18. If the re-alignment field strength $H_{re-align}$ is optimized, the direction of magnetization (i.e., alignment) of the longitudinally oriented magnetic domains $13_=$ of the magnetic recording layer 13 will be selectively reversed (as indicated by the arrows in the figure) at the areas facing the depressions 19 of the imprinting surface 17 of the stamper/imprinter 16, whereas the alignment of the longitudinally oriented magnetic domains $13_=$ of the magnetic recording layer 13 in contact with the projections 18 of the imprinting surface 17 of the stamper/imprinter 16 will be retained. Consequently, upon removal of the stamper/imprinter 16 and the re-alignment field $H_{re-align}$ in the next (i.e., final) step according to the inventive methodology, a longitudinal recording medium 1 is formed with a magnetic transition pattern comprising a plurality of reversely longitudinally oriented magnetic domains $13_{=R}$ corresponding to a desired servo pattern.

Present magnetic patterning apparatus are comprised of magnet means with variable spacing between poles, and, as a consequence, whenever a stamper/imprinter+media combination is inserted in the inter-polar space for performing magnetic patterning by contact printing, steps for actuation of the magnet, adjustment of the pole gap, and tuning of the magnetic field to a desired intensity must be performed. However, inasmuch as the steps for performing magnet actuation, pole gap adjustment, and magnetic field tuning are time consuming, obtainment of high product throughput rates is disadvantageously compromised by use of existing methodology and equipment. Further, current contact printing apparatus employ electromagnets which are powered by a DC current source, and as a consequence, active cooling of the magnet assembly is required to prevent overheating. Moreover, obtainment of increased magnetic field strengths from such DC powered electromagnets for reducing processing time and increasing product throughput rates disadvantageously incurs very high power consumption rates, hence increased processing cost.

Accordingly, there exists a need for methodology and means for performing servo patterning by contact printing which is free of the above-described drawbacks and disadvantages arising from the requirement for performing time-consuming actuation of the magnet, adjustment of the pole gap, and tuning of the magnetic field to a desired intensity each time a stamper/imprinter+media combination is inserted in the contact printing apparatus in the space between the magnet poles. Moreover, there exists a need for methodology and instrumentalities for performing rapid, cost-effective servo patterning of thin film, high areal recording density magnetic recording media which do not engender the above-stated concerns associated with existing methodologies/instrumentalities for patterning of magnetic media utilizing DC-powered magnet assemblies.

The present invention addresses and solves the above-described problems, disadvantages, and drawbacks associated with prior methodologies for servo pattern formation in thin film magnetic recording media, while maintaining full compatibility with the requirements of automated magnetic hard disk manufacturing technology.

DISCLOSURE OF THE INVENTION

An advantage of the present invention is an improved method of forming a magnetic transition pattern in a magnetic material by contact printing.

Another advantage of the present invention is an improved method of forming a servo pattern in a magnetic recording medium.

Yet another advantage of the present invention is an improved apparatus for forming a magnetic transition pattern in a magnetic material by contact printing.

Still another advantage of the present invention is an improved apparatus for forming a servo pattern in a magnetic recording medium.

Additional advantages and other features of the present invention will be set forth in the description which follows and in part will become apparent to those having ordinary skill in the art upon examination of the following or may be learned from the practice of the present invention. The advantages of the present invention may be realized as particularly pointed out in the appended claims.

According to one aspect of the present invention, the foregoing and other advantages are obtained in part by a method of forming a magnetic transition pattern in a magnetic material by contact printing, comprising steps of:

(a) providing a stacked assembly including:
  (i) a workpiece including a surface comprised of the magnetic material, the magnetic material including a plurality of initialized, unidirectionally aligned magnetic domains; and
  (ii) a stamper having an imprinting surface in intimate contact with the surface of the workpiece, the imprinting surface comprising a plurality of projections and depressions arranged in a pattern corresponding to the magnetic transition pattern to be formed in the magnetic material, the stamper being formed of at least one high saturation magnetization, high permeability magnetic material;
(b) providing a contact printing apparatus including a magnet means having a pair of spaced-apart, stationary magnetic poles with a fixed gap therebetween, the magnet means adapted for providing a unidirectional re-alignment magnetic field of uniform and fixed intensity between the magnetic poles;
(c) placing the stacked assembly of the workpiece and the stamper in the gap between the magnetic poles, with an orientation such that the direction of the unidirectional re-alignment magnetic field between the magnetic poles is opposite the direction of alignment of the unidirectionally aligned, initialized magnetic domains of the magnetic material; and
(d) applying the unidirectional, uniform, and fixed intensity re-alignment magnetic field from the magnet means to the stacked assembly of the workpiece and the stamper for an interval sufficient to effect selective re-alignment of the magnetic domains of those portions of the magnetic material which are in contact with the projections of the imprinting surface of the stamper or which face the depressions of the imprinting surface of the stamper, such that the magnetic domains of the contacted portions or the facing portions are unidirectionally aligned in a second direction reverse that of the first direction, and the combination of initialized magnetic domains+re-aligned magnetic domains forms a pattern replicating the pattern of projections and depressions of the imprinting surface of the stamper.

According to embodiments of the present invention, step (a) comprises providing a stacked assembly including:
  (i) a workpiece for a magnetic recording medium, the workpiece including a non-magnetic substrate with a layer of a magnetic recording material overlying a surface thereof; and
  (ii) a stamper having an imprinting surface including a plurality of projections and depressions arranged in a pattern corresponding to a servo pattern to be replicated in the surface of the magnetic material; for example, step (a) comprises providing a stacked assembly including:
  (i) a disk-shaped workpiece including a substrate comprised of a non-magnetic material selected from the group consisting of Al, NiP-plated Al, Al—Mg alloys, other Al-based alloys, other non-magnetic metals, other non-magnetic metal-based alloys, glass, ceramics, polymers, glass-ceramics, and composites and/or laminates thereof; and
  (ii) a stamper having an imprinting surface formed of at least one high saturation magnetization, high permeability magnetic material selected from the group consisting of Ni, NiFe, CoNiFe, CoSiFe, CoFe, and CoFeV.

In accordance with particular embodiments of the present invention, step (a) further comprises forming the stacked assembly by steps including:
  (1) placing the imprinting surface of the stamper in contact with the workpiece surface;
  (2) placing a first clamp plate on a side of the stamper opposite the imprinting surface thereof;
  (3) placing a second clamp plate on a side of the workpiece opposite the surface comprised of the magnetic material; and
  (4) fixedly mounting at least one clamp means extending from the first clamp plate to the second clamp plate; wherein the combination of the first and second clamp plates and the clamp means forms the stacked assembly, wherein the imprinting surface of the stamper is urged into intimate contact with the workpiece surface.

Embodiments of the present invention include those wherein step (a) further comprises placing the workpiece in a unidirectional DC erase magnetic field having a direction and high strength sufficient to provide the initialized, unidirectional alignment of said plurality of magnetic domains; and step (b) comprises providing a contact printing apparatus including a permanent magnet means or an electromagnet means.

Embodiments of the invention according to the latter alternative include those wherein step (b) comprises providing a contact printing apparatus including a pulsed current electromagnet means for providing increased magnetic field intensities and reduced re-alignment intervals without increase in power consumption or magnet heating, and wherein step (b) comprises providing a contact printing apparatus including a laminated electromagnet means for minimizing eddy currents.

According to a specific embodiment of the present invention, step (a) comprises providing a workpiece wherein the magnetic material is a layer of a perpendicular magnetic recording material including a plurality of initialized magnetic domains unidirectionally aligned in a first direction perpendicular to the surface by prior treatment in a unidirectional DC erase magnetic field;

step (b) comprises providing a contact printing apparatus with a fixed pole gap magnet means for providing a suitably oriented, unidirectional re-alignment magnetic field of uniform intensity;

step (c) comprises placing the stacked assembly of the workpiece and the stamper in the fixed gap between the magnetic poles of the contact printing apparatus with an orientation such that the unidirectional re-alignment magnetic field between the magnetic poles is in a second direction opposite that of the first direction; and step (d) comprises applying the unidirectional re-alignment magnetic field of the second direction for an interval sufficient to selectively reverse the alignment of the magnetic domains of the portions of the magnetic material in contact with the projections of the imprinting surface of the stamper, while retaining the first direction, initialized alignment of the magnetic domains of the portions of the magnetic material facing the depressions of the imprinting surface of the stamper; wherein:

step (a) comprises providing a stamper having an imprinting surface including a plurality of projections and depressions arranged in a pattern corresponding to a servo pattern; and step (d) comprises replicating the servo pattern in the surface of the perpendicular magnetic recording material.

According to another specific embodiment of the present invention, step (a) comprises providing a workpiece wherein the magnetic material is a layer of a longitudinal magnetic recording material including a plurality of initialized magnetic domains unidirectionally aligned in a first direction parallel to the surface by prior treatment in a unidirectional DC erase magnetic field;

step (b) comprises providing a contact printing apparatus with a fixed pole gap magnet means for providing a suitably oriented, unidirectional re-alignment magnetic field of uniform intensity;

step (c) comprises placing the stacked assembly of the workpiece and the stamper in the fixed gap between the magnetic poles of the contact printing apparatus with an orientation such that the unidirectional re-alignment magnetic field between the magnetic poles is in a second direction opposite that of the first direction; and step (d) comprises applying the unidirectional re-alignment magnetic field of second direction for an interval sufficient to selectively reverse the alignment of the magnetic domains of the portions of the magnetic material facing the depressions of the imprinting surface of the stamper, while retaining the first direction, initialized alignment of the magnetic domains of the portions of the magnetic material in contact with the projections of the imprinting surface of the stamper; wherein:

step (a) comprises providing a stamper having an imprinting surface including a plurality of projections and depressions arranged in a pattern corresponding to a servo pattern; and step (d) comprises replicating said servo pattern in the surface of the longitudinal magnetic recording material.

Another aspect of the present invention is an apparatus for forming a magnetic transition pattern in a magnetic material by contact printing, comprising:

(a) a magnet means having a pair of spaced-apart, stationary magnetic poles with a fixed gap therebetween, the magnet means adapted for providing a suitably oriented, unidirectional magnetic re-alignment field of fixed and uniform intensity to an initialized, unidirectionally magnetically aligned magnetic recording medium positioned within the fixed gap; and (b) means for positioning in the fixed gap a stacked assembly comprised of the magnetic recording medium and a patterned imprinting surface of a high saturation magnetization, high permeability stamper in contact therewith, such that the direction of the unidirectional magnetic re-alignment field provided by the magnet means is opposite the direction of alignment of the initialized, unidirectionally aligned magnetic magnetic recording medium for effecting selective magnetic re-alignment of the magnetic recording medium for replicating the pattern of the patterned imprinting surface of the stamper in the surface of the magnetic recording medium.

According to alternative embodiments of the present invention, the magnet means (a) is a permanent magnet means or an electromagnet means. In the latter instance, the electromagnet means is a pulsed current electromagnet means for providing increased magnetic field intensities and reduced re-alignment intervals without increase in power consumption or magnet heating, may comprise a capacitive discharge power supply, and may be a laminated electromagnet means for minimizing eddy currents.

Yet another aspect of the present invention is an apparatus for forming a magnetic transition pattern in a workpiece including a magnetic material, comprising:

(a) unidirectional magnetic field means including a fixed gap between magnet poles; and (b) means for positioning the workpiece within the fixed gap.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects, all without departing from the spirit of the present invention. Accordingly, the drawings and description are to be regarded as illustrative in nature, and not limitative.

BRIEF DESCRIPTION OF THE DRAWINGS

The following detailed description of the embodiments of the present invention can best be understood when read in conjunction with the following drawings, in which the various features are not necessarily drawn to scale but rather are drawn as to best illustrate the pertinent features, and in which like reference numerals are employed throughout to designate similar features, wherein.

DESCRIPTION OF THE INVENTION

The present invention addresses and solves problems and drawbacks attendant upon the use of conventionally configured contact printing apparatus in performing cost-efficient, high product throughput, automated manufacturing processing for forming magnetic transition patterns, for example servo patterns, in a magnetic material, e.g., a thin film of a magnetic material constituting the active recording layer of longitudinal or perpendicular thin film magnetic recording media. Specifically, the present invention is based upon recognition by the inventor that a limiting factor in performing cost-effective, high product throughput (i.e., rapid) contact printing of a magnetic material, e.g., for forming a servo pattern therein, according to conventional methodologies for automated manufacture of recording media, are the time-consuming requirements for: (1) adjusting the spacing (or gap) between the magnetic poles of the contact printing apparatus each time a workpiece/stamper combination is inserted in the inter-pole space or gap for performing selective re-alignment, (2) activating the magnet, and (3) tuning (i.e., adjusting) the magnetic field intensity to a desired value, which time-consuming requirements are eliminated, or at least substantially reduced, by utilizing a contact printing apparatus according to the invention, comprised of a fixed-gap, fixed intensity, uniform field magnet means. In addition, the present invention is based upon recognition by the inventor that: (4) the requirement for intensive magnet cooling for preventing overheating of the conventionally employed DC-energized magnets is eliminated, or at least significantly reduced, by use of a pulsed current magnet which is capable of simultaneously providing increased field strengths, hence increased product throughput rates, without significant increase in power consumption; and (5) disadvantageous formation of eddy currents in the magnet may be minimized by utilizing a laminated magnet design.

Figure 6:
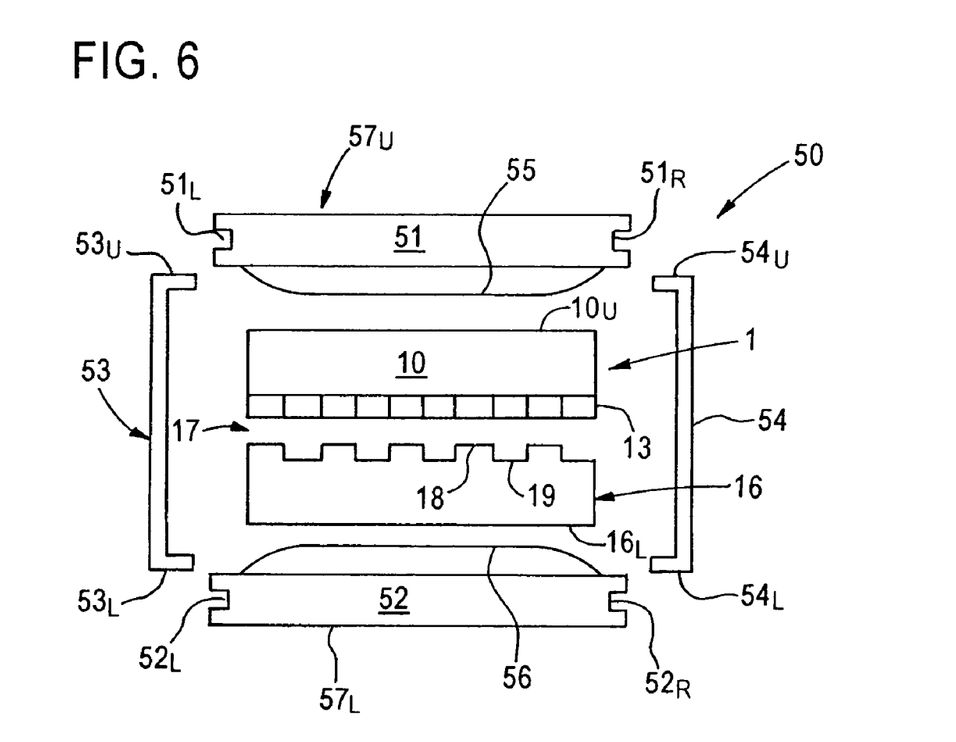
FIG. 6 illustrates, in schematic, simplified, exploded cross-sectional view, the components of a media/stamper stack assembly according to the present invention, and their relative positions in the assembly.

A feature of the present invention is formation of a pre-assembled, pre-compressed magnetic media/stamper stack adapted for suitably oriented positioning of the media/stamper stack in the gap between fixed poles of a magnet adapted for providing the stack with a unidirectional re-alignment field of uniform and fixed intensity. Referring to FIG. 6, shown therein, in schematic, simplified, exploded cross-sectional view, are the components of a media/stamper stack assembly 50 according to the present invention, and their relative positions in assembly 50.

As illustrated, media/stamper stack assembly 50 comprises a stamper/imprinter 16 (as described supra), including a body of a magnetic material having a high saturation magnetization $B_{sat}$ and a high permeability $\mu$, with an upwardly facing imprinting surface 17 comprised of a patterned plurality of projections 18 and depressions 19 corresponding to a pattern, e.g., a servo pattern, to be formed in a facing surface of a magnetic recording layer 13 of a magnetic recording medium 1 comprising non-magnetic substrate 10. Overlying the upwardly facing surface $10_U$ of substrate 10 is a first, or upper clamp plate $57_U$ comprised of a generally flat planar clamp plate member 51 composed of a non-magnetic material (e.g., a non-magnetic metal or alloy) of sufficient thickness as to be substantially rigid, and including notch-like recesses $51_L$ and $51_R$ formed in the respective left and right edges thereof. Resilient, spring-like member 55 is fixedly mounted to the lower surface of the first, or upper clamp plate $57_U$ for providing a compressive force to the upwardly facing surface $10_U$ of substrate 10 for providing intimate contact between the surface of magnetic recording layer 13 of medium 1 and imprinting surface 17 of stamper/imprinter 16 after assembly. Similarly, underlying the downwardly facing surface $16_L$ of stamper/imprinter 16 is a second, or lower clamp plate $57_L$ comprised of a generally flat planar clamp plate member 52 composed of a non-magnetic material (e.g., a non-magnetic metal or alloy) of sufficient thickness as to be substantially rigid, and including notch-like recesses $52_L$ and $52_R$ formed in the respective left and right edges thereof. Resilient, spring-like member 56 is fixedly mounted to the upper surface of the second, or lower clamp plate $57_L$ for providing a compressive force to the downwardly facing surface $16_L$ of stamper/imprinter 16 for providing intimate contact between imprinting surface 17 of stamper/imprinter 16 and the surface of magnetic recording layer 13 of medium 1. Completing media/stamper stack assembly 50 are left and right, generally C-shaped clamps 53 and 54, respectively, made of non-magnetic material (e.g., a non-magnetic metal or metal alloy) and having respective upper and lower flanges $53_U$, $53_L$ and $54_U$, $54_L$ for engaging respective recesses $51_L$, $52_L$ and $51_R$, $52_R$ formed in the upper and lower clamp late members 51 and 52. Thus, upon insertion of each of the upper and lower flanges of each of the left and right clamps into the respective left and right notches of the upper and lower clamp members, a pre-assembled media/stamper stack assembly 50 is formed wherein the imprinting surface 17 of stamper/imprinter 16 and the surface of magnetic recording layer 13 of medium 1 are maintained in intimate contact with a pre-selected pressure, e.g., ~200 psi, applied therebetween.

According to the invention, medium 1 is subjected to magnetic initialization, i.e., DC erase (as described supra in connection with the description of FIGS. 4–5) of the magnetic recording layer 13, either prior or subsequent to formation of the media/stamper stack assembly 50. In either instance, the media/stamper stack assembly 50 with magnetically initialized (i.e., unidirectionally aligned) magnetic domains is then installed in the inter-polar space (i.e., gap) of a fixed gap, constant field contact printing apparatus according to the present invention for performing selective re-alignment of the magnetic domains in a pattern corresponding to the pattern of projections and depressions formed in the imprinting surface of the stamper/imprinter.

Figure 7:
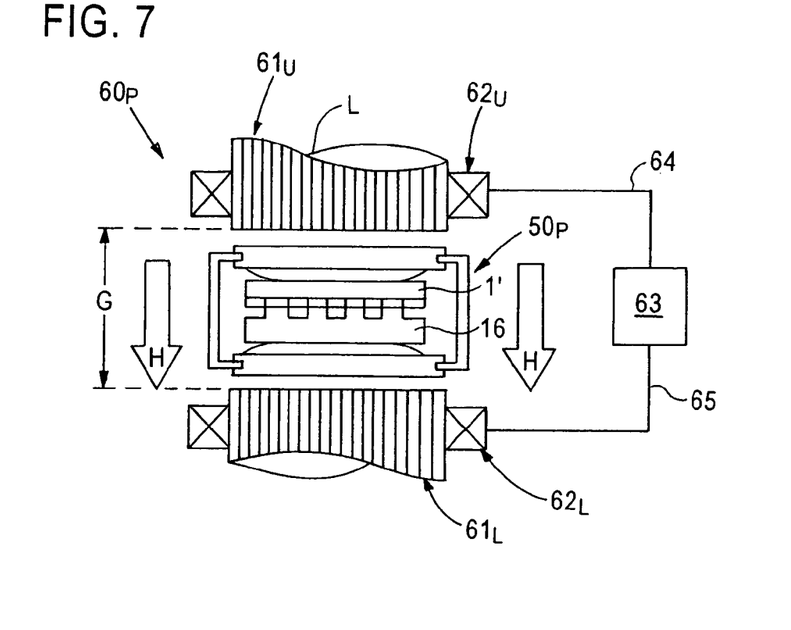
FIG. 7 illustrates, in schematic, simplified cross-sectional view, a fixed-gap contact printing apparatus according to the invention adapted for performing contact printing of perpendicular magnetic recording media.
Figure 8:
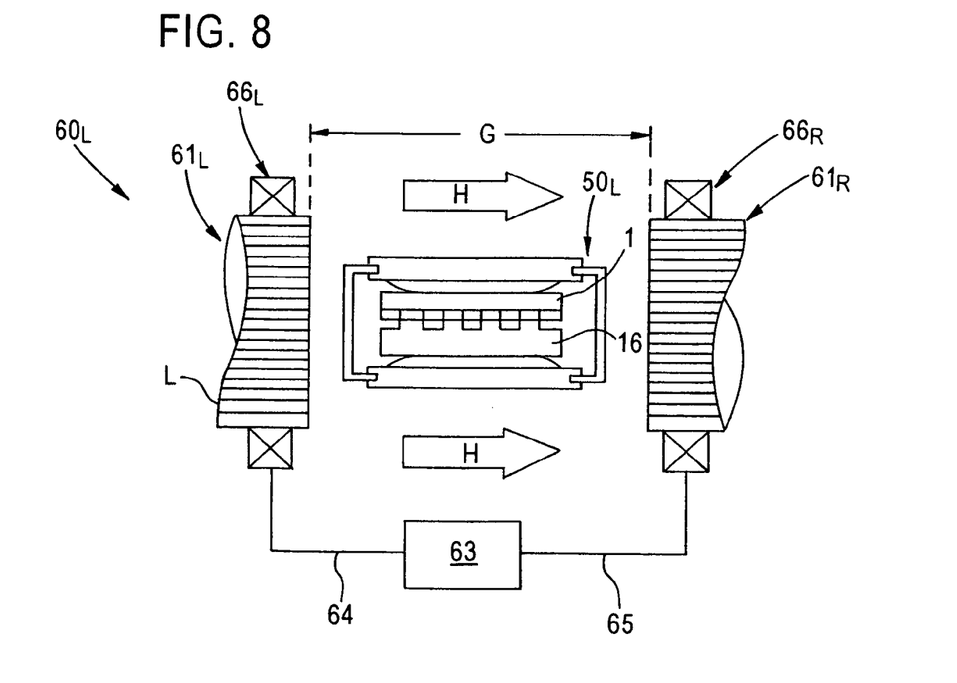
FIG. 8 illustrates, in schematic, simplified cross-sectional view, a fixed-gap contact printing apparatus according to the invention adapted for performing contact printing of longitudinal magnetic recording media.

Adverting to FIGS. 7–8, shown therein, in schematic, simplified cross-sectional views, are illustrative, but not limitative, embodiments of fixed-gap contact printing apparatus $60_P$ and $60_L$ according to the invention, adapted for performing contact printing of perpendicular and longitudinal magnetic recording media, respectively. As shown, each apparatus $60_P$ and $60_L$ comprises a magnet assembly or unit including a pair of magnet poles separated by a fixed gap G, i.e., vertically oriented poles $61_U$ and $61_L$ of apparatus $60_P$ for contact printing of a perpendicular magnetic recording medium 1' forming part of media 1'/stamper 16 stack assembly $50_P$ positioned in the fixed inter-polar space defined by gap G (by means not shown in FIG. 7 for illustrative simplicity), and horizontally oriented poles $61_L$ and $61_R$ of apparatus $60_L$ for contact printing of a longitudinal magnetic recording medium 1 forming part of media 1/stamper 16 stack assembly $50_L$ positioned in the fixed inter-polar space defined by gap G (also by means not shown in FIG. 8 for illustrative simplicity).

According to preferred embodiments of the invention, the magnet assembly or unit of each contact printing apparatus $60_P$ and $60_L$ is provided as an electromagnet including respective pairs of actuating coils $62_U$, $62_L$ and $66_L$, $66_R$ connected to a power supply 63 via conductors 64 and 65; however, each of the magnet assemblies may, if desired, comprise a permanent magnet. In addition, according to preferred embodiments of the invention, power supply 63 is adapted for supplying pulsed energization currents, e.g., ~40 to ~50 A pulses of 1 msec. or less duration, whereby higher magnetic fields H for increased product throughput are achievable with smaller increase in power consumption; and each of the magnet poles is comprised of a plurality of laminations L for minimizing eddy currents.

According to the inventive methodology, a pre-assembled media/stamper stack assembly $50_P$ or $50_L$ is rapidly installed in (and rapidly removed from) the inter-polar gap G of a respective contact printing apparatus $60_P$ or $60_L$ (as by conventional automated handling/positioning means), and essentially immediately subjected to contact printing by virtue of the uniform and high intensity magnetic field H applied between the opposed magnet poles, without requiring adjustment of the inter-polar gap G and tuning (i.e., adjustment) of magnetic field intensity H. As a consequence, the inventive methodology/apparatus advantageously provides increased product throughput rates, relative to those provided by existing contact printing apparatus with variable inter-pole gaps G. Moreover, the use of pulsed rather than DC magnet energization advantageously facilitates obtainment of very high field intensities H without substantially increasing power consumption, thereby minimizing cooling requirements of the magnet assembly. Finally, it should be appreciated that while FIG. 7 illustrates a fixed contact printing apparatus according to the invention wherein a vertically oriented magnetic field H is utilized for patterning of a perpendicular recording medium, and FIG. 8 illustrates a fixed contact printing apparatus according to the invention wherein a horizontally oriented magnetic field H is utilized for patterning of a longitudinal recording medium, the invention is not so limited, i.e., the same or either apparatus may be utilized for patterning both perpendicular and longitudinal magnetic recording media merely by appropriately orienting the media/stamper stack assembly in the inter-polar gap.

It should be apparent to one of ordinary skill in the art that the invention provides a significant improvement over the conventional art such as has been described above, particularly but not exclusively, with respect to the inherent ease and simplicity of the method. Further, the imprinting surface 17 of contact-type stamper/imprinter 16 can be formed with a wide variety of magnetic transition patterns, whereby the inventive methodology can be rapidly, easily, and cost-effectively implemented in the automated manufacture of a number of articles, devices, etc., requiring magnetic transition patterning, of which longitudinal and perpendicular magnetic recording media merely constitute several examples of the versatility and utility of the inventive methodology.

In the previous description, numerous specific details are set forth, such as specific materials, structures, reactants, processes, etc., in order to provide a better understanding of the present invention. However, the present invention can be practiced without resorting to the details specifically set forth. In other instances, well-known processing materials and techniques have not been described in detail in order not to unnecessarily obscure the present invention.

Only the preferred embodiments of the present invention and but a few examples of its versatility are shown and described in the present disclosure. It is to be understood that the present invention is capable of use in other combinations and environments and is susceptible of changes and/or modifications within the scope of the inventive concept as expressed herein.

What is claimed is:

1. A method of forming a magnetic transition pattern in a magnetic material by contact printing, comprising steps of:
   (a) providing a stacked assembly including:
      (i) a workpiece including a surface comprised of said magnetic material, said magnetic material including a plurality of initialized, unidirectionally aligned magnetic domains; and
      (ii) a stamper having an imprinting surface in intimate contact with said surface of said workpiece, said imprinting surface comprising a plurality of projections and depressions arranged in a pattern corresponding to said magnetic transition pattern to be formed in said magnetic material, said stamper being formed of at least one high saturation magnetization, high permeability magnetic material;
   (b) providing a contact printing apparatus including a magnet means having a pair of spaced-apart, stationary magnetic poles with a fixed gap therebetween, said magnet means adapted for providing a unidirectional re-alignment magnetic field of uniform and fixed intensity between said magnetic poles;
   (c) placing said stacked assembly of said workpiece and said stamper in said gap between said magnetic poles, with an orientation such that the direction of said unidirectional re-alignment magnetic field between said magnetic poles is opposite the direction of alignment of said unidirectionally aligned, initialized magnetic domains of said magnetic material; and
   (d) applying said unidirectional, uniform, and fixed intensity re-alignment magnetic field from said magnet means to said stacked assembly of said workpiece and said stamper for an interval sufficient to effect selective re-alignment of the magnetic domains of those portions of said magnetic material which are in contact with said projections of said imprinting surface of said stamper or which face said depressions of said imprinting surface of said stamper, such that said magnetic domains of said contacted portions or said facing portions are unidirectionally aligned in a second direction reverse that of said first direction, and the combination of initialized magnetic domains+re-aligned magnetic domains forms a pattern replicating said pattern of projections and depressions of said imprinting surface of said stamper.

2. The method according to claim 1, wherein:
   step (a) comprises providing a stacked assembly including:
   (i) a workpiece for a magnetic recording medium, said workpiece including a non-magnetic substrate with a layer of a magnetic recording material overlying a surface thereof; and
   (ii) a stamper having an imprinting surface including a plurality of projections and depressions arranged in a pattern corresponding to a servo pattern to be replicated in said surface of said magnetic material.

3. The method according to claim 2, wherein:
step (a) comprises providing a stacked assembly including:
(i) a disk-shaped workpiece including a substrate comprised of a non-magnetic material selected from the group consisting of Al, NiP-plated Al, Al—Mg alloys, other Al-based alloys, other non-magnetic metals, other non-magnetic metal-based alloys, glass, ceramics, polymers, glass-ceramics, and composites and/or laminates thereof; and
(ii) a stamper having an imprinting surface formed of at least one high saturation magnetization, high permeability magnetic material selected from the group consisting of Ni, NiFe, CoNiFe, CoSiFe, CoFe, and CoFeV.

4. The method according to claim 1, wherein:
step (a) further comprises forming said stacked assembly by steps including:
(1) placing said imprinting surface of said stamper in contact with said workpiece surface;
(2) placing a first clamp plate on a side of said stamper opposite said imprinting surface thereof;
(3) placing a second clamp plate on a side of said workpiece opposite said surface comprised of said magnetic material; and
(4) fixedly mounting at least one clamp means extending from said first clamp plate to said second clamp plate;
wherein the combination of said first and second clamp plates and said clamp means forms said stacked assembly, wherein said imprinting surface of said stamper is urged into intimate contact with said workpiece surface.

5. The method according to claim 1, wherein:
step (a) further comprises placing said workpiece in a unidirectional DC erase magnetic field having a direction and high strength sufficient to provide said initialized, unidirectional alignment of said plurality of magnetic domains.

6. The method according to claim 1, wherein:
step (b) comprises providing a contact printing apparatus including a permanent magnet means.

7. The method according to claim 1, wherein:
step (b) comprises providing a contact printing apparatus including an electromagnet means.

8. The method according to claim 7, wherein:
step (b) comprises providing a contact printing apparatus including a pulsed current electromagnet means for providing increased magnetic field intensities and reduced re-alignment intervals without increase in power consumption or magnet heating.

9. The method according to claim 7, wherein:
step (b) comprises providing a contact printing apparatus including a laminated electromagnet means for minimizing eddy currents.

10. The method according to claim 1, wherein:
step (a) comprises providing a workpiece wherein said magnetic material is a layer of a perpendicular magnetic recording material including a plurality of initialized magnetic domains unidirectionally aligned in a first direction perpendicular to said surface by prior treatment in a unidirectional DC erase magnetic field;
step (b) comprises providing a contact printing apparatus with a fixed pole gap magnet means for providing a suitably oriented, unidirectional re-alignment magnetic field of uniform intensity;
step (c) comprises placing said stacked assembly of said workpiece and said stamper in said fixed gap between said magnetic poles of said contact printing apparatus with an orientation such that said unidirectional re-alignment magnetic field between said magnetic poles is in a second direction opposite that of said first direction; and
step (d) comprises applying said unidirectional re-alignment magnetic field of said second direction for an interval sufficient to selectively reverse the alignment of said magnetic domains of said portions of said magnetic material in contact with said projections of said imprinting surface of said stamper, while retaining the first direction, initialized alignment of said magnetic domains of the portions of said magnetic material facing said depressions of said imprinting surface of said stamper.

11. The method according to claim 10, wherein:
step (a) comprises providing a stamper having an imprinting surface including a plurality of projections and depressions arranged in a pattern corresponding to a servo pattern; and
step (d) comprises replicating said servo pattern in said surface of said perpendicular magnetic recording material.

12. The method according to claim 1, wherein:
step (a) comprises providing a workpiece wherein said magnetic material is a layer of a longitudinal magnetic recording material including a plurality of initialized magnetic domains unidirectionally aligned in a first direction parallel to said surface by prior treatment in a unidirectional DC erase magnetic field;
step (b) comprises providing a contact printing apparatus with a fixed pole gap magnet means for providing a suitably oriented, unidirectional re-alignment magnetic field of uniform intensity;
step (c) comprises placing said stacked assembly of said workpiece and said stamper in said fixed gap between said magnetic poles of said contact printing apparatus with an orientation such that said unidirectional re-alignment magnetic field between said magnetic poles is in a second direction opposite that of said first direction; and
step (d) comprises applying said unidirectional re-alignment magnetic field of said second direction for an interval sufficient to selectively reverse the alignment of said magnetic domains of said portions of said magnetic material facing said depressions of said imprinting surface of said stamper, while retaining the first direction, initialized alignment of said magnetic domains of the portions of said magnetic material in contact with said projections of said imprinting surface of said stamper.

13. The method according to claim 12, wherein:
step (a) comprises providing a stamper having an imprinting surface including a plurality of projections and depressions arranged in a pattern corresponding to a servo pattern; and
step (d) comprises replicating said servo pattern in said surface of said longitudinal magnetic recording material.

14. An apparatus for forming a magnetic transition pattern in a magnetic material by contact printing, comprising:
(a) a magnet means having a pair of spaced-apart, stationary magnetic poles with a fixed gap therebetween, said magnet means adapted for providing a suitably oriented, unidirectional magnetic re-alignment field of fixed and uniform intensity to an initialized, unidirectionally magnetically aligned magnetic recording medium positioned within said fixed gap; and (b) means for positioning in said fixed gap a stacked assembly comprised of said magnetic recording medium and a patterned imprinting surface of a high saturation magnetization, high permeability stamper in contact therewith, such that the direction of said unidirectional magnetic re-alignment field provided by said magnet means is opposite the direction of alignment of said initialized, unidirectionally magnetically aligned magnetic recording medium for effecting selective magnetic re-alignment of said magnetic recording medium for replicating the pattern of said patterned imprinting surface of said stamper in the surface of said magnetic recording medium.

15. The apparatus as in claim 14, wherein:
said magnet means (a) is a permanent magnet means.

16. The apparatus as in claim 14, wherein said magnet means (a) is an electromagnet means.

17. The apparatus as in claim 16, wherein:
said electromagnet means is a pulsed current electromagnet means for providing increased magnetic field intensities and reduced re-alignment intervals without increase in power consumption or magnet heating.

18. The apparatus as in claim 17, wherein:
said pulsed current electromagnet means comprises a capacitive discharge power supply.

19. The apparatus as in claim 16, wherein:
said electromagnet means is a laminated electromagnet means for minimizing eddy currents.

20. An apparatus for forming a magnetic transition pattern in a workpiece including a magnetic material, comprising:

(a) unidirectional magnetic field means including a fixed gap between magnet poles; and (b) means for positioning a said workpiece within said fixed gap.

* * * * *